US010719056B2

(12) United States Patent
Barrick et al.

(10) Patent No.: US 10,719,056 B2
(45) Date of Patent: Jul. 21, 2020

(54) MERGING STATUS AND CONTROL DATA IN A RESERVATION STATION

(71) Applicant: International Business Machines Corporation, Armonk, NY (US)

(72) Inventors: Brian D. Barrick, Pflugerville, TX (US); Joshua W. Bowman, Austin, TX (US); Jeffrey C. Brownscheidle, Seattle, WA (US); Sundeep Chadha, Austin, TX (US); Michael J. Genden, Austin, TX (US); Dhivya Jeganathan, Austin, TX (US); Dung Q. Nguyen, Austin, TX (US); Salim A. Shah, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 336 days.

(21) Appl. No.: 15/144,333

(22) Filed: May 2, 2016

(65) Prior Publication Data

US 2017/0315528 A1 Nov. 2, 2017

(51) Int. Cl.
*G06F 8/38* (2018.01)
*G05B 19/042* (2006.01)
*G06F 9/38* (2018.01)
*G06Q 10/02* (2012.01)

(52) U.S. Cl.
CPC ....... *G05B 19/0426* (2013.01); *G06F 9/3814* (2013.01); *G06F 9/3836* (2013.01); *G05B 2219/32137* (2013.01); *G06Q 10/02* (2013.01); *Y02P 90/16* (2015.11); *Y02P 90/185* (2015.11)

(58) Field of Classification Search
CPC ................. G06F 7/764; G06F 9/30018; G06F 2003/0697; G06F 8/4435; G06F 9/30079; G06F 2003/30079; G06F 9/3842; G06F 9/30094
See application file for complete search history.

(56) References Cited

U.S. PATENT DOCUMENTS

| 5,487,159 | A | * | 1/1996 | Byers | G06F 9/30029 |
| | | | | | 712/223 |
| 5,813,037 | A | | 9/1998 | Martell et al. | |
| 5,867,663 | A | | 2/1999 | Witt et al. | |
| 5,878,266 | A | * | 3/1999 | Goddard | G06F 9/30025 |
| | | | | | 712/23 |
| 6,105,129 | A | | 8/2000 | Meier et al. | |

(Continued)

*Primary Examiner* — Aimee Li
*Assistant Examiner* — Kasim Alli
(74) *Attorney, Agent, or Firm* — Patterson + Sheridan, LLP

(57) ABSTRACT

Embodiments herein describe a reservation station (RS) in a processor that merges control data from multiple sources into a merged control data value. Before an instruction issues, the RS gathers and saves control data indicating how the instruction is to be executed. This control data may be saved in control registers. An instruction, however, can update many different types of status control bits in these registers. As such, the RS may store different types of control data for an instruction. Instead of the RS containing multiple registers and data paths for every type of control data, the embodiments herein describe merge logic in the RS that permits control data from different sources to be merged into a single control data value. Once the instruction is issued, the RS passes the merged control data value to an execution unit for processing.

20 Claims, 5 Drawing Sheets

(56) References Cited

U.S. PATENT DOCUMENTS

| | | | |
|---|---|---|---|
| 7,996,662 B2* | 8/2011 | Lien | G06F 9/30094<br>712/244 |
| 2008/0082791 A1* | 4/2008 | Chennupaty | G06F 9/30101<br>712/217 |

* cited by examiner

SOURCE ONE LREG MAPPING

| LREG (0:4) | DESCRIPTION | SIZE | PORTION OF BUS | POSITION IN MERGED DATA |
|---|---|---|---|---|
| 11000 | CR0 | 4 | 0:3 | 0:3 |
| 11001 | CR1 | 4 | 4:7 | 0:3 |
| 11010 | CR2 | 4 | 8:11 | 0:3 |
| 11011 | CR3 | 4 | 12:15 | 0:3 |
| 11100 | CA, OC | 2 | 0:1 | 0:1 |
| 11101 | TGCC | 3 | 0:2 | 0:2 |
| 11110 | FP CONTROL | 11 | 0:10 | 0:10 |
| 11111 | NJ | 1 | 10 | 10 |

MERGING STATUS AND CONTROL DATA IN A RESERVATION STATION

BACKGROUND

The present invention relates to managing control data in a reservation station, and more specifically, to merging control data from multiple sources into a merged control data value.

A reservation station (RS) holds data for an instruction in a processor until all the data is ready to issue. Once ready, the RS transmits the data to an execution unit in the processor targeted by the instruction. The reservation station may permit the processor to fetch and re-use a data value as soon as the value has been computed. Before permitting an instruction to issue, the RS checks if the necessary data has been stored and if the targeted execution unit is free.

SUMMARY

One embodiment of the present invention is a processor that includes an execution unit and a reservation station. The reservation station is configured to select first control data from a first source and second control data from a second source different from the first source where the first and second control data indicate how an instruction is to be processed by the execution unit. The reservation station is further configured to generate respective bit masks for identifying relevant data in the first control data and the second control data, merge the identified relevant data from the first and second control data into merged control data and, upon determining the instruction is ready to issue, provide the merged control data to the execution unit for processing the instruction.

Another embodiment of the present invention is a reservation station disposed in an integrated circuit. The reservation station includes source selection logic configured to select first control data from a first source and second control data from a second source different from the first source, where the first and second control data indicate how an instruction is to be processed by an execution unit. The reservation station also includes source merge logic configured to generate respective bit masks for identifying relevant data in the first control data and the second control data, merge the identified relevant data from the first and second control data into merged control data, and, upon determining the instruction is ready to issue, provide the merged control data to the execution unit for processing the instruction.

Another embodiment of the present invention is a method of operating a reservation station in a processor. The method includes selecting first control data from a first source and second control data from a second source different from the first source where the first and second control data indicate how an instruction is to be processed by an execution unit in the processor. The method also includes generating respective bit masks for identifying relevant data in the first control data and the second control data, merging the identified relevant data from the first and second control data into merged control data, and, upon determining the instruction is ready to issue, providing the merged control data to the execution unit for processing the instruction.

BRIEF DESCRIPTION OF THE SEVERAL VIEWS OF THE DRAWINGS

FIG. 5 is a chart for generating bit masks for selecting source control data, according to one embodiment described herein.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments herein describe a reservation station (RS) in a processor that merges control data from multiple sources into a merged control data value. Before an instruction issues, the RS gathers and saves control data indicating how the instruction is to be executed. This control data may be saved in control registers such as floating point status and control registers (FPSCR), fixed point exception registers (XER), and condition registers (CR). An instruction, however, can update many different types of status control bits in these registers. As such, the RS may store different types of control data for an instruction. Instead of the RS containing multiple registers and data paths for every type of control data, the embodiments herein describe merge logic in the RS that permits control data from different sources to be merged into a single merged control data value. Once the instruction is issued, the RS passes the merged control data value to an execution unit for processing.

Figure 1:
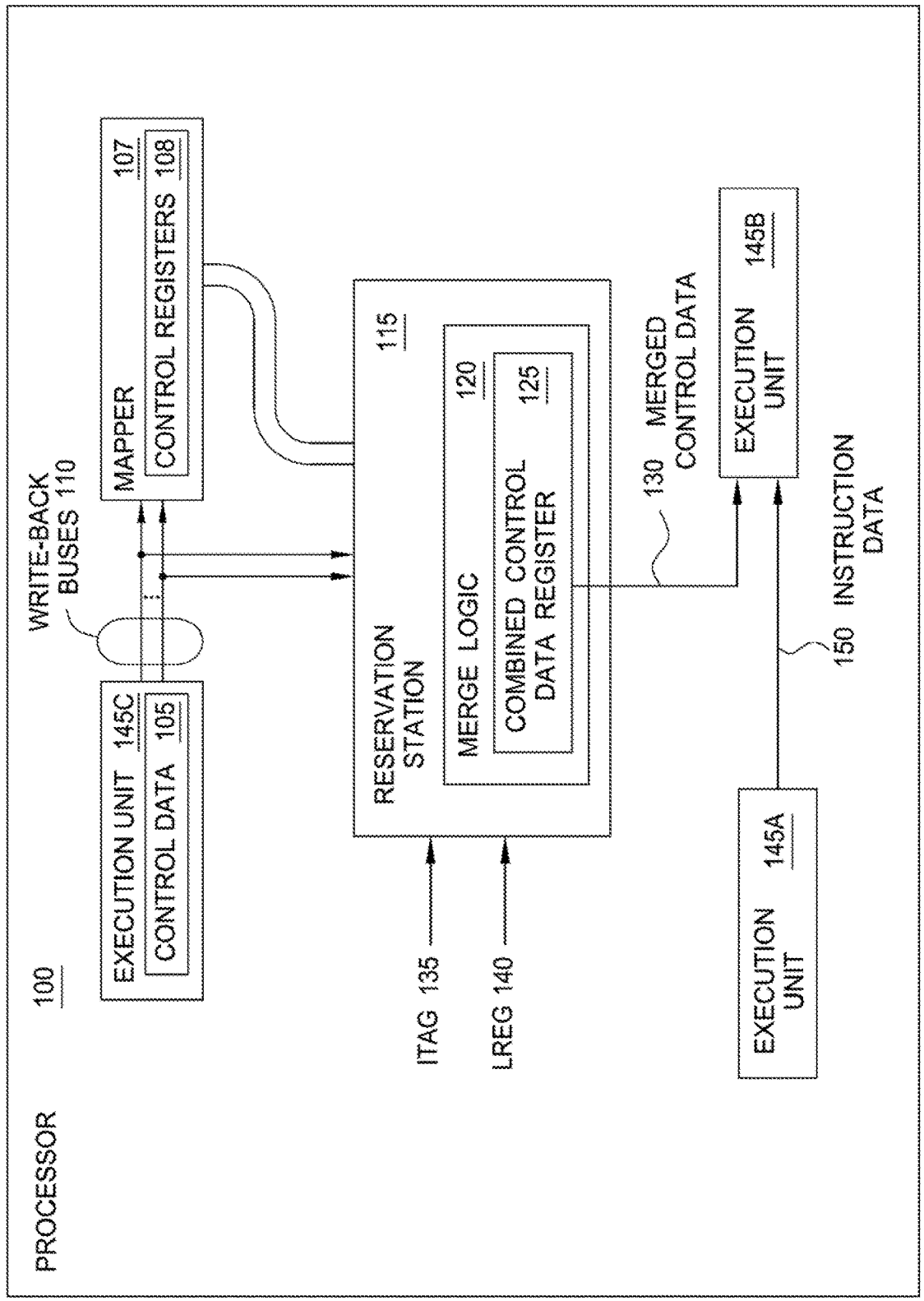
FIG. 1 is a processor that includes a reservation station for merging control data, according to one embodiment described herein.

FIG. 1 is a processor 100 that includes a RS 115 for merging control data, according to one embodiment described herein. The processor 100, which can be formed using one or more integrated circuits, includes an execution unit 145C and a mapper 107 which are coupled to the RS 115. Once an instruction has been executed by the execution unit 145C, the data is written back via write-back buses 110 for a dependent instruction to capture and use. As shown, the write-back buses 110 transmit the data from the execution unit 145C to both the mapper 107 and the RS 115. Moreover, the execution unit 145C includes control data 105 which can be different types of control data. For example, the control data 105 may include FPSCR, XER, and CR control data which is generated after executing an instruction. The mapper 107 includes control registers 108 for storing the control data 105.

The RS 115 receives an instruction tag (ITAG) 135 and a logical register (LREG) 140 from a mapper (not shown). Generally, the ITAG 135 identifies a particular instruction in the processor 100. That is, each instruction executing in the processor 100 receives a unique ITAG 135. The LREG 140 (also referred to generally as classification data) identifies the type of the instruction—e.g., an add, move, load, store etc. The RS 115 includes merge logic 120 which receives control data from multiple sources—i.e., different write-back buses 110 or the mapper 107. For example, a particular instruction may require control data from different sources. In one embodiment, the RS 115 is waiting for control data 105 that has not yet been generated—i.e., the current instruction is dependent on an instruction that has not yet be processed by the execution unit 145C. In this case, the control data 105 will come from the execution unit 145C via the write-back buses 110. However, if the control data 105 needed by an instruction has already been generated, this control data 105 is stored in the registers 108 and can be retrieved from the mapper 107.

Instead of providing different data paths and registers for the different sources passing data to the RS 115 (i.e., execution unit 145C and the control registers 108 in the mapper 107), the merge logic 120 combines the control data from the sources into merged control data which is stored in a combined control data register 125. As described in detail below, the merge logic 120 uses the ITAG 135 and LREG 140 as inputs to determine which of the buses 110 to select and what control data on those buses 110 should be stored in the register 125.

Although FIG. 1 illustrates selecting control data using a single ITAG 135, the RS 115 can merge control data from multiple instructions. For example, the merge logic 120 can determine if multiple buses 110 correspond to multiple instructions, and if so, merge the control data into the combined control data register 125.

Processor 100 also includes execution unit 145B which uses the control data saved in the register 125 to execute an instruction. Once an instruction is ready to issue, the RS 115 forwards the merged control data 130 stored in the register 125 to the execution unit 145B targeted by the instruction. Put differently, the RS 115 selects which execution unit 145 in the processor 100 should execute the instruction based on, for example, the type of instruction. Here, execution unit 145B is selected to execute the instruction. The RS 115 provides the control data 130 for executing the instruction while execution unit 145A provides instruction data 150 to the execution unit 145B. The control data 130 instructs the execution unit 145B how to process the instruction data 150B. For example, the instruction data 150 may include floating point data while the control data 130 defines how to handle exceptions that may arise when the unit 145B processes the floating point data. Using the merge logic 120, the RS 115 can transmit control data from multiple different sources (e.g., multiple write-back buses 110) to the executing unit 145B as a single merged control data value.

Figure 2:
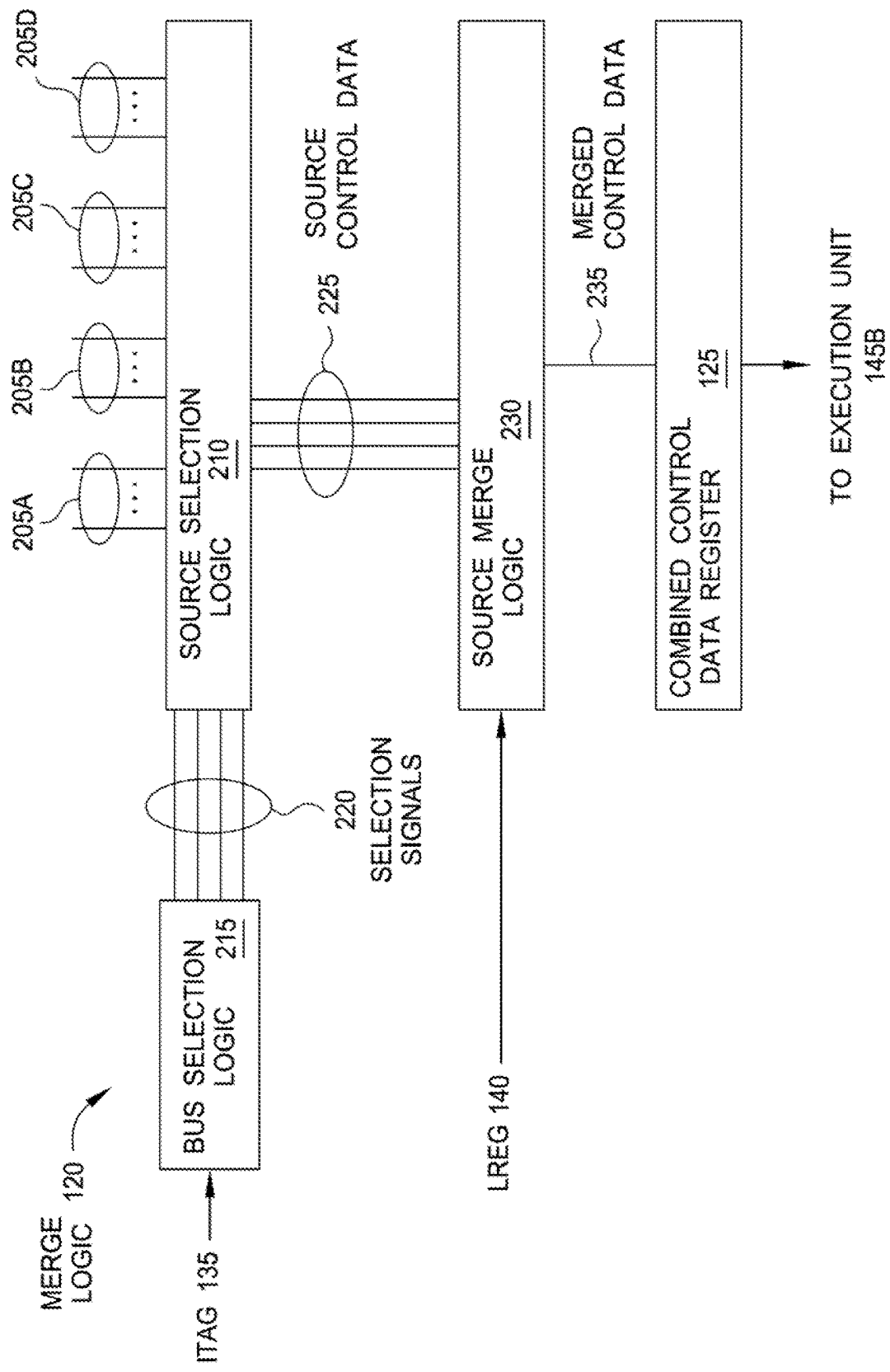
FIG. 2 is a block diagram of logic in a reservation station for merging control data, according to one embodiment described herein.

FIG. 2 is a block diagram of merge logic 120 in a RS for merging control data, according to one embodiment described herein. The merge logic 120 includes source selection logic 210 for selecting one or more of the source buses 205. Specifically, the source selection logic 210 uses selection signals 220 provided by bus selection logic 215 to select one or more sources of control data—i.e., the execution unit 145C or mapper 107 shown in FIG. 1. As such, the source buses 205 can include the write-back buses 110 coupling the RS 115 to the execution unit 145C or the data buses coupling the RS 115 to the mapper 107. In this embodiment, the source selection logic 210 can select up to four different sources. As shown, the source buses 205 are divided into four groups—i.e., source bus groups 205A, 205B, 205C, and 205D. Depending on the selection signals 220, the source selection logic 210 selects a source bus 205 from one, two, three, or four of the groups 205A-D. Moreover, if the instruction does not need any control data, then none of the source buses 205 are selected as sources.

The bus selection logic 215 uses the ITAG 135 (i.e., an respective ID for each of the sources of the control data) to generate the selection signals 220. Each instruction's source may match different ITAGs 135 which means different source buses may get selected. For example, the bus selection logic 215 can instruct the source selection logic 210 to select source buses from multiple groups 205A-D. For instance, an instruction may need both XER and CR data in order to execute. Using the instructions ITAG 135, the bus selection logic 215 provides selection signals 220 to the source selection logic 210 which may select, for example, one of the buses in group 205A and another bus from group 205C.

The source selection logic 210 outputs source control data 225 which is shown as having four different buses, one for each of the four different groups 205A-D. However, depending on the selection signals 220, the source selection logic 210 may forward control data from zero, one, two, three, or four of the source bus groups 205A-D to source merge logic 230.

If source control data 225 from multiple sources is sent by the source selection logic 210, the source merge logic 230 merges the control data into a single control data value. For example, assuming a bus from each of the four groups 205A-D was selected, source control data 225 includes control data from four different sources. For example, if the four buses carrying the source control data 225 are each 27 bits wide, the source selection logic 210 can transmit up to 108 bits of source control data 225 to the source merge logic 230.

However, not all of the source control data 225 may be relevant for executing the instruction corresponding to the ITAG 135. For example, some of the control data 225 may be redundant. For instance, the only control data needed by the instruction may be four bits of control data 225 from a first source (e.g., one of the buses in group 205A), one bit from a second source (e.g., one of the buses in group 205B), four bits from a third source (e.g., one of the buses in group 205C), and ten bits from a fourth source (e.g., one of the buses in group 205D). Using the LREG 140 stored for each of the sources, the source merge logic 230 identifies the relevant data from each of the sources and combines this data into a single merged control data value.

As described in greater detail below, the source merge logic 230 generates bit masks for selecting the relevant data and removing the irrelevant data from the sources. Continuing the previous example, the source merge logic 230 generates four bit masks to select only four bits from the first source, one bit from the second source, four bits from the third source, and ten bits from the fourth source. The source merge logic 230 then merges these bits into merged control data 235 which is stored in the combined control data register 125.

In one example, an instruction can have four sources and each of those sources can expect data from different instructions that will be executed by an execution unit at different times. The merge logic 120 may repeat the process as different data arrives on the source buses 205 (i.e., as the different instructions are executed). In response, the source merge logic 230 updates the combined control data register 125 with the newly received control data. In one embodiment, the merged control data 235 already stored in the combined control data register 125 is updated with the newly received merged control data. For example, assuming the register 125 stores 27 bits of control data, the newly received control data may update only bits (4:7). The source merge logic 230 uses the previously saved control data to populate bits (0:3) and (8:26) but replaces the old control data at (4:7) with the new control data.

Once all the control data is received and the instruction is ready to issue, the merge logic 120 in the RS transmits the control data value in the combined control data register 125 to the targeted execution unit (e.g., execution unit 145B) for processing.

Figure 3:
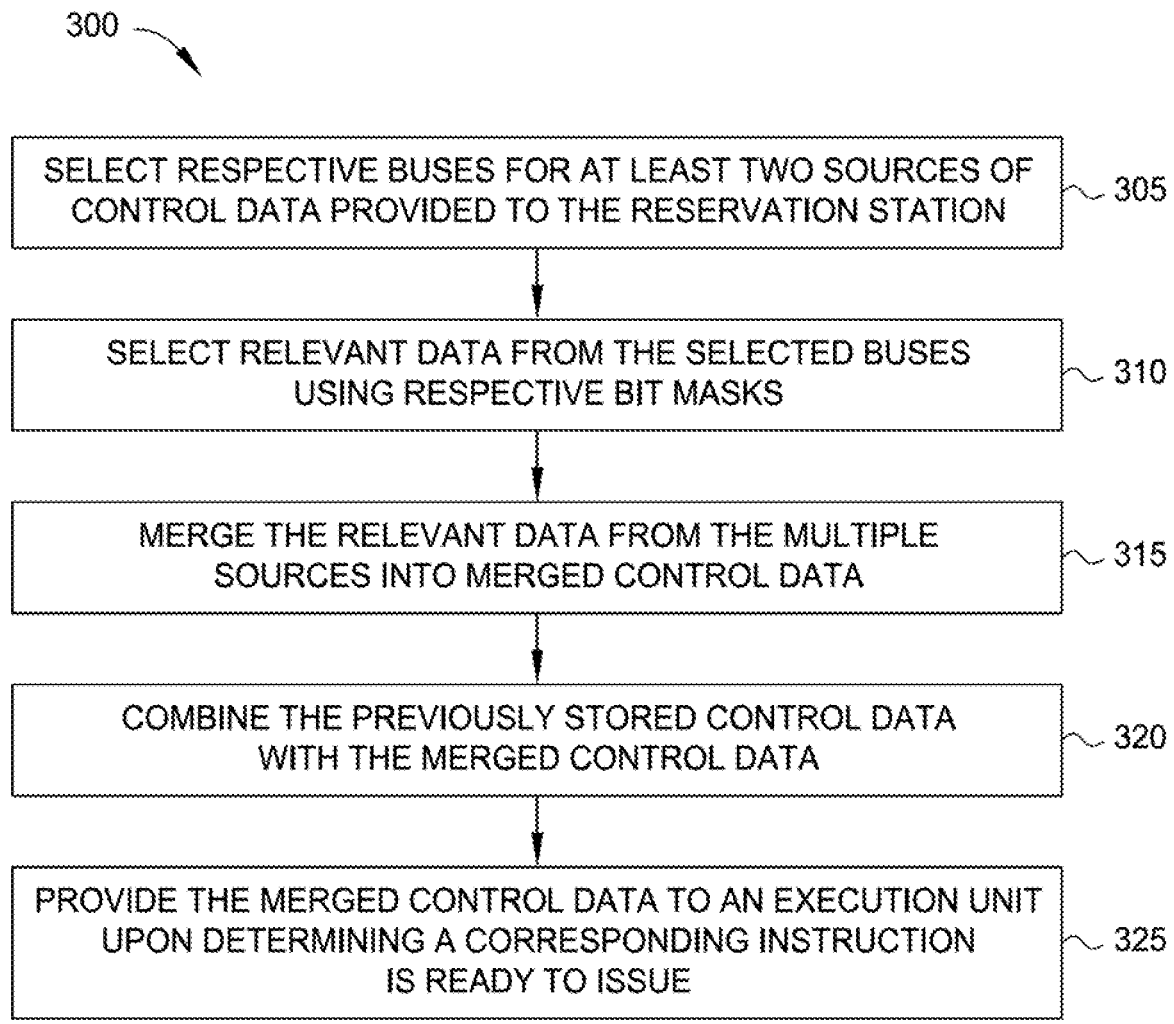
FIG. 3 is a flowchart for merging control data in a reservation station, according to one embodiment described herein.

FIG. 3 is a flowchart of a method 300 for merging control data in a RS, according to one embodiment described herein. For illustration purposes, the blocks of method 300 are discussed with the merge logic 120 of the RS shown in FIG. 4.

Figure 4:
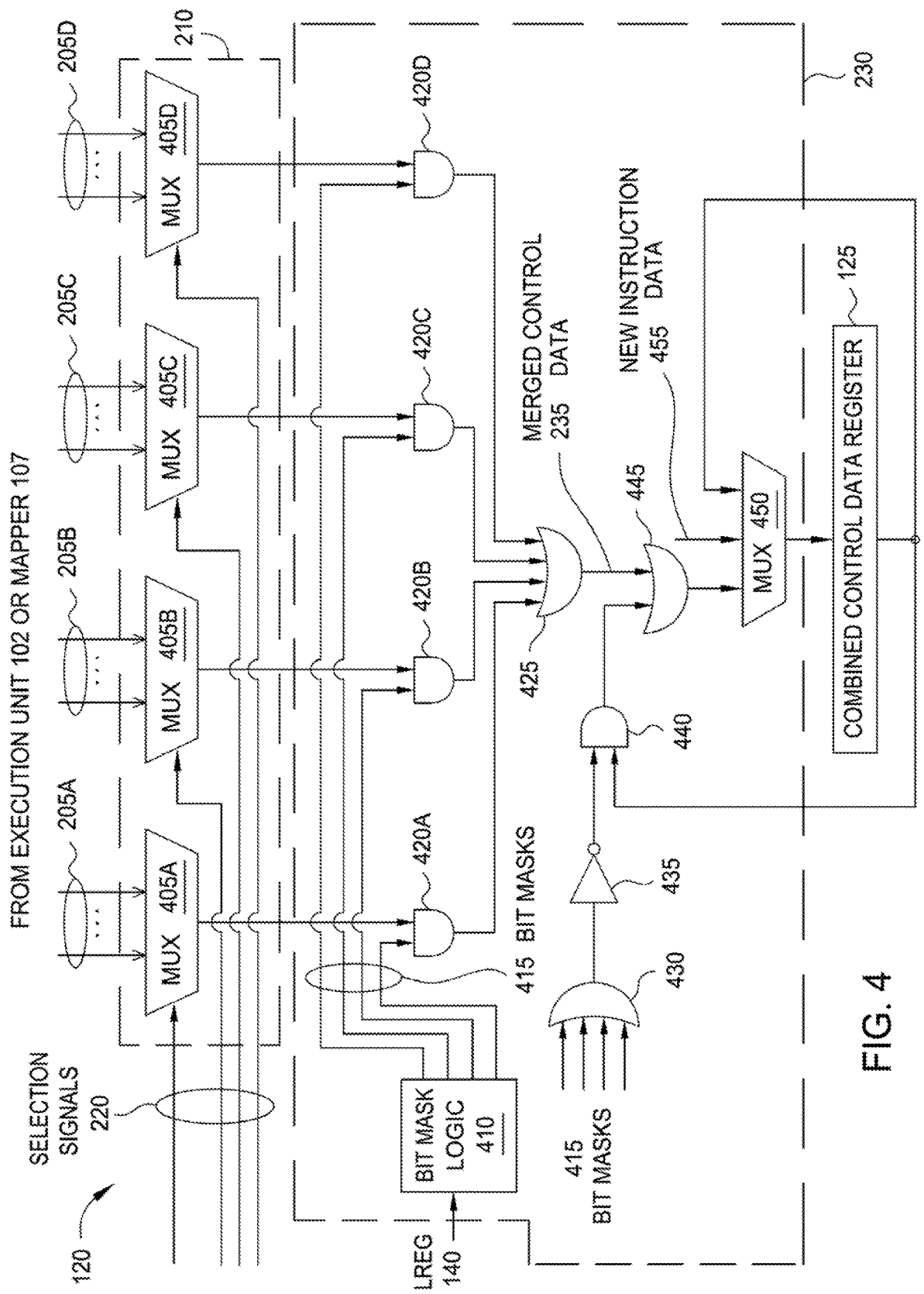
FIG. 4 is logic in a reservation station for merging control data, according to one embodiment described herein.

At block 305, the source selection logic 210 selects a bus for at least two sources of control data provided to the RS. For example, FIG. 4 illustrates that the logic 210 includes multiplexers (muxes) 405 coupled to the source buses in the groups 205A-D. Using the selection signals 220, each mux 405 selects one (or none) of the source buses in a group 205 as a source of control data. In one embodiment, the RS performs an ITAG compare to determine which of the buses matches the current ITAG being evaluated. If there is a match, the merge logic 120 generates the selection signals 220 to select the corresponding source bus 205 to use as a source. Each ITAG may match zero, one, two, three, or four of the buses in the groups 205A-D. In method 300, it is assumed that at least two different sources of control data match the ITAG, and thus, at least two of the muxes 405 (also referred to as source muxes) transmit control data to AND gates 420. Moreover, although four groups 205A-D are shown the merge logic 120 can receive control data from any number of different sources.

At block 310, source merge logic 230 selects relevant data from the selected buses using respective bit masks 415. As shown in FIG. 4, the source merge logic 230 includes bit mask logic 410 which uses LREG 140 to output the bit masks 415. Generally, LREG 140 identifies the type of instruction currently being evaluated by the RS. For example, a move two instruction may require CR control data that is transmitted on a larger source bus 205 than a normal move instruction that receives CR control data using a source bus 205 with a smaller width. In response to the type of instruction, the bit mask logic 410 generates a bit mask that masks a different portion of the data received from the source muxes 405. For example, if the four data buses between the muxes 405 and the AND gates 420 are each 27 bits wide, for one type of instruction the bit mask logic 410 permits only bits (0:3) to pass through the AND gate 420A but permits bits (0:10) to pass through for a different type of instruction. Stated generally, the bit masks 415 permit the relevant data to pass through the AND gates 420 while the irrelevant data (if any) is zeroed out.

In one embodiment, each bit mask 415 masks different portions of the data transmitted by the muxes 405. For example, assuming control data from four different sources are selected using the selection signals 220, the bit mask logic 410 generates masks that ensure the relevant data for each of the four different sources is non-overlapping. That is, the bit mask logic 410 maps data received from different sources to different mask bits so that these data bits are not lost when combined by OR gate 425. For example, each source mux 405 may transmit 27 bits of control data but only a portion of that data is relevant. The bit mask logic 410 generates the bit masks 415 so that the relevant portion of each source is assigned unique bits in the merged control data value. For example, for one instruction, the relevant data in the first source may be assigned bit positions (0:3), the second source is assigned positions (4:7), the third source is assigned positions (8:20), and the fourth source is assigned positions (21:26). In another example, if there are only two sources for the instruction, the first source may be assigned positions (4:7) while the second source is assigned bit position 10. Thus, although the bit positions for each source are non-overlapping, they do not need to be sequential.

FIG. 5 is a chart 500 for generating bit masks for selecting source control data, according to one embodiment described herein. In this embodiment, the RS can use chart 500 to generate bit masks for the control data outputted by the source mux 405A. As shown, a five bit LREG in the first column is used to identify the type of the instruction in the second column—e.g., CRO-3, Carry Bit (CA), Offset Carry Bit (OC), Tag Condition Code (TGCC), FP Control (i.e., the control field of the FPSCR), etc. The third column in chart 500 indicates the size or amount of the control data corresponding to each LREG. For example, the first four LREGs map to instructions that have four bits of control data while other types of instructions have different number of control bits (e.g., CA/OC has two bits and FP control has eleven bits). The fourth column informs the bit mask logic 410 what portion of the data received from the source is relevant. For example, the control data outputted by source mux 405A in FIG. 4 may include 27 bits, but only 1-11 of those bits are relevant. The bit mask selects only the relevant bits while the other bits are zeroed out. As an example, if the LREG is 11000, the bit mask would include ones at bit positions (0:3) to capture the relevant data and zeros at bit positions (4:26) to mask out the irrelevant data.

The fifth column indicates the position of the relevant data in the merged control data 235 shown in FIG. 4. Even though the relevant data may appear at one position in the source bus, the merge logic may move the relevant data to a different position in the merged control data 235 so that the relevant data does not overlap with relevant data from a different source. For example, the LREG in the second row in chart 500 maps to bit positions (4:7) in the 27 bits sent from mux 405A. However, these relevant bits are shifted to bit positions (0:3) in the merged control data 235. Doing so provides room for relevant data from other source muxes 405 in the merged control data 235. For example, for the same LREG instruction 11001, four bits of data from source mux 405B may be placed at bit positions (4:7) in the merged control data 235. As such, the RS may include a separate chart 500 to generate a bit mask for each of the different sources (i.e., for each of the groups 205A-D) so that relevant data from one source does not overlap relevant data for any of the other sources for each LREG.

Returning to FIG. 4, the OR gate 425 combines the non-overlapping relevant portions from at least two sources to generate the merged control data 235. Depending on the ITAG and LREG, all of the merged control data 235 may include relevant data or only a portion of the data 235 includes relevant data. For example, bits (0:3) in the merged control data 235 may include relevant data while bits (4:26) are zeros—i.e., irrelevant data. Conversely, bits 10 and (13:16) may include relevant data from at least two sources while the remaining 22 bits are zero. In this manner, control data from multiple sources can be merged into a single merged control data value 235.

At block 320, the source merge logic 230 updates the previously stored control data with the merged control data 235. To do so, the logic 230 includes an OR gate 445 which combines the unchanged control data already stored in the combined control data register 125 with updated merged control data 235. To select the unchanged control data, the RS includes an OR gate 430 which accepts the bit masks 415 as inputs. Thus, not only does the bit mask logic 410 send the bit masks 415 to the AND gates 420, but the same masks 415 are also sent to the OR gate 430 to identify which portions of the control data stored in the register 125 are not changed by the merged control data 235.

The OR gate 430 combines the bit masks 415 to create a single mask which indicates where new control data has been received from the source buses 205. For example, if the relevant data received from the source muxes 405 includes bits at positions (0:3) and (12:15), the output of the OR gate 430 would have ones at these positions and zeros for the other 19 bits of the merged control data 235. An inverter 435 inverts the combined bit mask so that the ones are now at the bit positions of the irrelevant data that were not updated by the sources—i.e., bit positions (4:11) and (16:26)—while the other 8 bits are zero.

The inverted bit mask is combined with the data previously stored in the combined control data register 125 by an AND gate 440. Doing so means that the data not being updated by the merged control data 235 remains while the data being updated by the data 235 is zeroed out. Stated differently, by combining and inverting the bit masks 415, the merge logic 120 identifies the data that is not changed by the control data received on the source buses 205. The unchanged control data is then combined with the merged control data 235 using an OR gate 445. However, if the combined bit mask outputted by the OR gate 430 was all ones (i.e., the sources provided updated control data for all 27 bits of the merged control data 235), then all of the previously stored control data in register 125 is overwritten by the merged control data 235.

The merge logic 120 includes a mux 450 which selects between the updated merged control data provided by the OR gate 445, a new instruction data 455, or the output of the register 125. The mux 450 selects the output of the OR gate 445 so long as at least one source matched the ITAG of the instruction. That is, if at least one of the source buses from one of the groups 205A-D was selected using the selection signals 220, then mux 450 writes the output of OR gate 445 into the register 125. However, if none of the sources (i.e., none of the source buses 205) match the ITAG, mux 450 rewrites the previously stored value into the combined control data register 125. Alternatively, the mux 450 may select the new instruction data 455 to write into the register 125 once an instruction has issued and a new instruction is being processed by the RS. For example, when dispatching a new instruction to the RS, the mapper may provide the new instruction data 455 to the mux 450 which initializes the register 125.

At block 325, the RS provides the merged control data to an execution unit upon determining the corresponding instruction is ready to issue. In one embodiment, once the RS determines that all the control data for an instruction has been received, the RS issues the merged control data stored in the register 125 to the appropriate execution unit for processing. As mentioned above, the control data in the register 125 indicates how the instruction is to be processed by the execution unit.

In the preceding, reference is made to embodiments presented in this disclosure. However, the scope of the present disclosure is not limited to specific described embodiments. Instead, any combination of the features and elements described above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A processor comprising:
an execution unit; and
a reservation station configured to:
    select, using an instruction tag corresponding to an instruction, first control data from a first source bus and second control data from a second source bus different from the first source bus;
    receive classification data indicating a type of the instruction;
    map the classification data to a bit position of relevant data in the first control data and to a bit position of relevant data in the second control data;
    generate, using the mapped classification data, respective bit masks for identifying relevant control data in the first control data and the second control data, wherein the relevant control data is used for processing the instruction by the execution unit;
    merge, using the respective bit masks, the relevant control data from the first and second control data into merged control data; and
    upon determining the instruction is ready to issue, provide the merged control data to the execution unit for processing the instruction.

2. The processor of claim 1, further comprising:
the first source bus and the second source bus coupled to at least two multiplexers in the reservation station, wherein the first control data is transmitted by the first source bus and the second control data is transmitted by the second source bus,
wherein the first and second source buses are selected by the multiplexers based on the instruction tag corresponding to the instruction.

3. The processor of claim 2, wherein the first and second source buses transmit at least one of floating point status and control register data and fixed point exception register data.

4. The processor of claim 1,
wherein one of the respective bit masks includes a logical one at the bit position.

5. The processor of claim 4, wherein the classification data indicates how many bits in the first control data are relevant and how many are irrelevant.

6. The processor of claim 1, wherein the respective bit masks are combined with the first and second control data to identify the relevant data and to zero out irrelevant data in the first and second control data.

7. The processor of claim 6, wherein the reservation station is configured to:
combine the merged control data with previously saved control data, wherein the previously saved control data corresponds to bit positions of the irrelevant data in at least one of the first and second control data.

8. A reservation station disposed in an integrated circuit, the reservation station comprising:
source selection logic configured to select, using an instruction tag corresponding to an instruction, first control data from a first source bus and second control data from a second source bus different from the first source bus; and source merge logic configured to:
receive classification data indicating a type of the instruction;
map the classification data to a bit position of relevant data in the first control data and to a bit position of relevant data in the second control data;
generate, using the mapped classification data, respective bit masks for identifying relevant control data in the first control data and the second control data,
wherein the relevant control data is used for processing the instruction by an execution unit,
merge, using the respective bit masks, the relevant control data from the first and second control data into merged control data, and
upon determining the instruction is ready to issue, provide the merged control data to the execution unit for processing the instruction.

9. The reservation station of claim 8, wherein the source selection logic comprises:
at least two multiplexers configured to couple to the first source bus and the second source bus, wherein the first control data is transmitted by the first source bus and the second control data is transmitted by the second source bus,
wherein the first and second source buses are selected by the multiplexers based on the instruction tag corresponding to the instruction.

10. The reservation station of claim 9, wherein the first and second source buses transmit at least one of floating point status and control register data and fixed point exception register data.

11. The reservation station of claim 8,
wherein one of the respective bit masks includes a logical one at the bit position.

12. The reservation station of claim 11, wherein the classification data indicates how many bits in the first control data are relevant and how many are irrelevant.

13. The reservation station of claim 8, wherein the respective bit masks are combined with the first and second control data to identify the relevant data and to zero out irrelevant data in the first and second control data.

14. The reservation station of claim 13, wherein the source merge logic is configured to:

combine the merged control data with previously saved control data, wherein the previously saved control data corresponds to bit positions of the irrelevant data in at least one of the first and second control data.

15. A method of operating a reservation station in a processor, the method comprising:
selecting, using an instruction tag corresponding to an instruction, first control data from a first source bus and second control data from a second source bus different from the first source bus;
receiving classification data indicating a type of the instruction;
mapping the classification data to a bit position of relevant data in the first control data and to a bit position of relevant data in the second control data;
generating, using the mapped classification data, respective bit masks for identifying relevant control data in the first control data and the second control data, wherein the relevant control data is used for processing the instruction by an execution unit;
merging, using the respective bit masks, the relevant control data from the first and second control data into merged control data; and
upon determining the instruction is ready to issue, providing the merged control data to the execution unit for processing the instruction.

16. The method of claim 15, further comprising:
receiving the first control data from the first source bus and the second control data from the second source bus, wherein the first and second source buses are selected by multiplexers in the reservation station based on the instruction tag corresponding to the instruction.

17. The method of claim 16, wherein the first and second source buses transmit at least one of floating point status and control register data and fixed point exception register data.

18. The method of claim 15,
wherein one of the respective bit masks includes a logical one at the bit position.

19. The method of claim 18, wherein the classification data indicates how many bits in the first control data are relevant and how many are irrelevant.

20. The method of claim 15, wherein the respective bit masks are combined with the first and second control data to identify the relevant data and to zero out irrelevant data in the first and second control data.

* * * * *